H. GRIMES.
MACHINE FOR LEVELING AND ROLLING SNOW ON ROADS.
APPLICATION FILED NOV. 13, 1909.
955,590.
Patented Apr. 19, 1910.
2 SHEETS—SHEET 1.
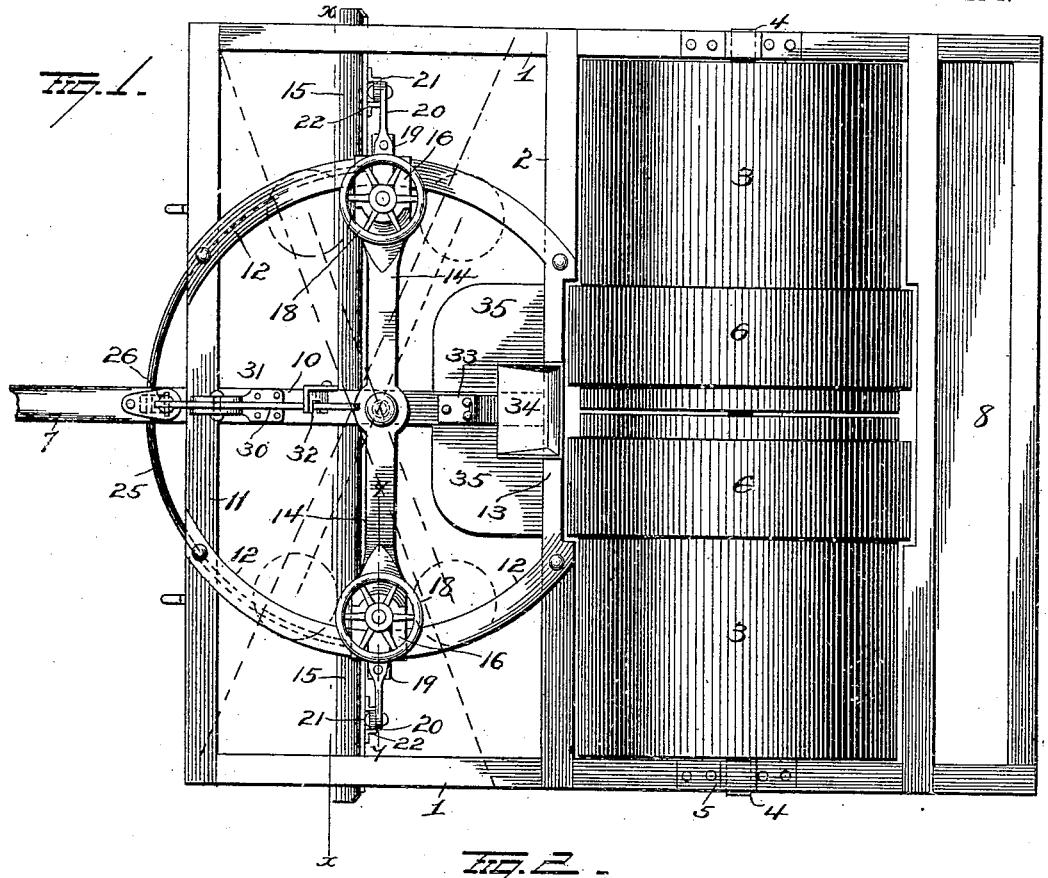
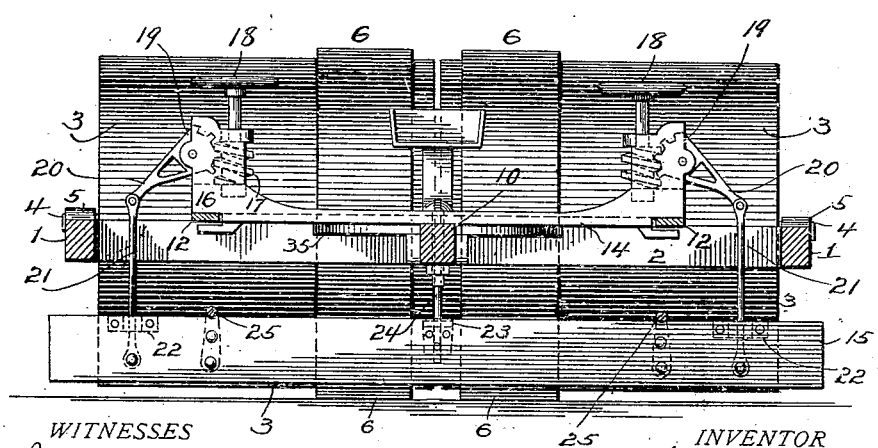
WITNESSES
INVENTOR
H. Grimes H. GRIMES.
MACHINE FOR LEVELING AND ROLLING SNOW ON ROADS.
APPLICATION FILED NOV. 13, 1909.
955,590.
Patented Apr. 19, 1910.
2 SHEETS—SHEET 2.
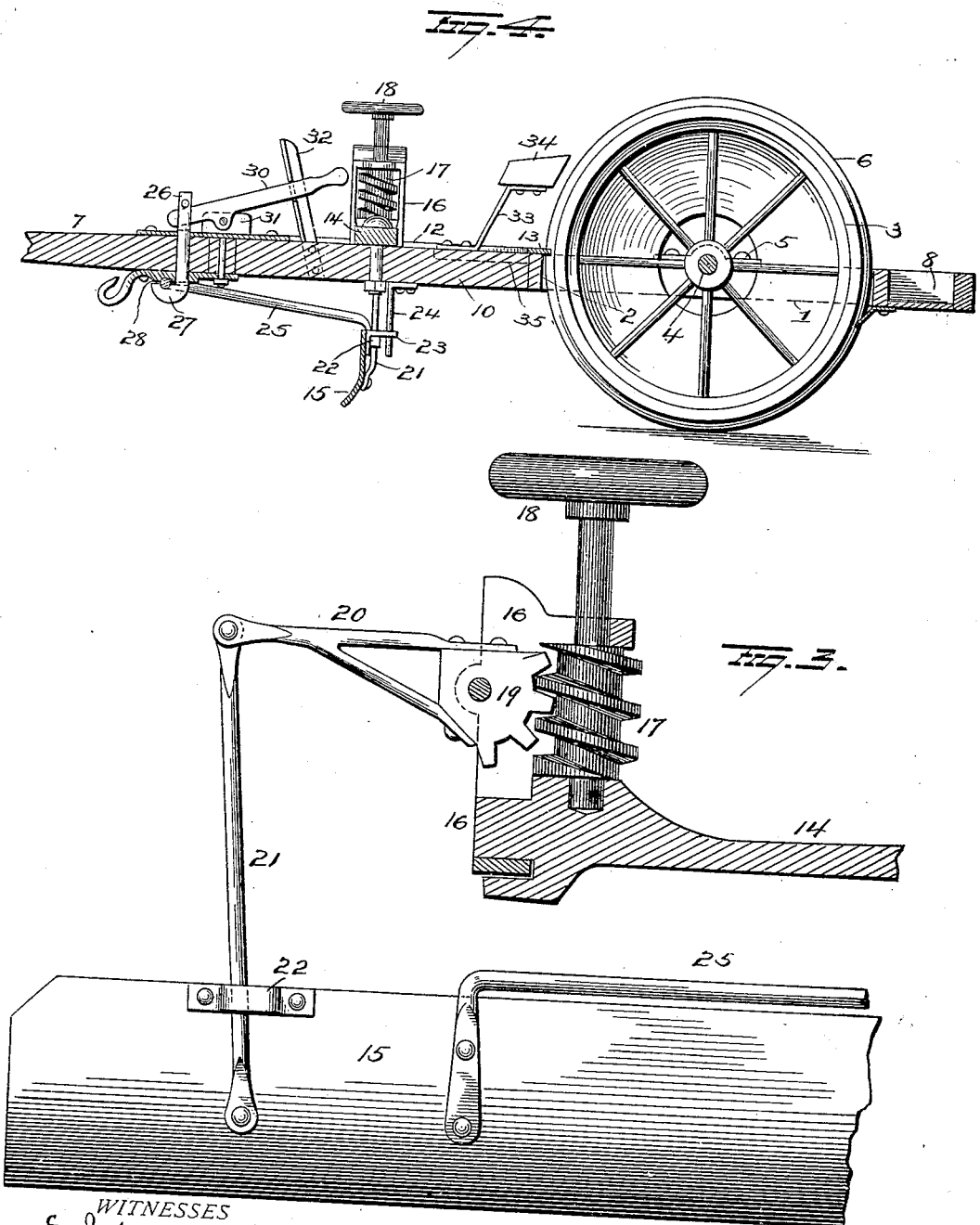

UNITED STATES PATENT OFFICE.

HOWARD GRIMES, OF NEWCOMB, NEW YORK.

MACHINE FOR LEVELING AND ROLLING SNOW ON ROADS.

955,590. Specification of Letters Patent. Patented Apr. 19, 1910.

Application filed November 13, 1909. Serial No. 527,925.

*To all whom it may concern:*

Be it known that I, HOWARD GRIMES, of Newcomb, in the county of Essex and State of New York, have invented certain new and useful Improvements in Machines for Leveling and Rolling Snow on Roads; and I do hereby declare the following to be a full, clear, and exact description of the invention, such as will enable others skilled in the art to which it appertains to make and use the same.

This invention relates to improvements in machines for leveling and rolling snow on roads,—the object of the invention being to provide simple and efficient means for properly supporting a mold board or scraper and adjusting the same both vertically and angularly, and to construct the roller or rollers in such manner that a hardened path or paths will be made in the snow for the draft animals.

With this object in view the invention consists in certain novel features of construction and combinations of parts as hereinafter set forth and pointed out in the claims.

In the accompanying drawings, Figure 1 is a plan view of a machine embodying my improvements. Fig. 2 is a transverse sectional view on the line *x—x* of Fig. 1. Fig. 3 is a sectional view on the line *y—y* of Fig. 1, and Fig. 4 is a longitudinal sectional view.

1 represents a rectangular frame having a central or approximately central transverse bar 2 between which and the rear end of the frame, rollers 3 are disposed. These rollers are mounted on a shaft 4 having its ends journaled in suitable bearings 5 on the side-bars of the frame 1. Each roller 3 is provided with an enlarged annular portion 6 and these annular enlargements will serve to form hardened trackways in the snow for the accommodation of draft animals of following teams,—the harness traces being connected with the forward end of the frame through the medium of any suitable attaching devices and for the accommodation of the forward portions of the harness, a tongue 7 projects forwardly from the front end of the frame 1. A box 8 is located at the rear end of the frame 1 for the reception of ballast which will serve to counterbalance the machine and relieve the draft animals from the weight thereof. To the rear portion of the frame in rear of the rollers, scrapers 9 for said rollers are secured.

Located between the side bars of the frame 1 and in line with the longitudinal axis of the machine, a bar 10 extends from the transverse bar 2 to the front end bar 11 of the frame. Segmental plates 12—12 are located equal distances from respective sides of the longitudinal bar 10 and extend from the transverse bar 2 to the front end bar 11 of the frame,—the rear ends of said segmental plates being connected together by a plate or strip 13 made integral with said segmental plates and located upon the central transverse bar 2 of the frame.

Pivotally supported between its ends upon the longitudinal bar 10 is a carrier 14 for a mold board or scraper 15,—the latter being connected with said carrier through the medium of adjusting devices which will now be explained. The carrier 14 is provided at its respective ends with standards 16 and in each of these standards, a worm 17 is mounted and provided with a hand operating wheel 18. A toothed segment 19 is pivotally supported in each standard 16 and meshes with the adjacent worm 17. Each toothed segment 19 is provided with an outwardly projecting arm 20, to the free end of which one end of a vertical rod 21 is pivotally attached. The vertical rods 21 pass through suitable guides 22 secured to the mold board or scraper and at their lower ends, said rods are pivotally attached to the mold board or scraper. The intermediate portion of the mold board or scraper 15 is provided with a lug 23 having a hole for the passage of a rod or pin 24 depending from the bar 10 of the frame so as to guide the mold board or scraper in its vertical movements and also constitute a pivotal connection of the same with the frame.

A curved yoke 25 is secured at its ends to the mold board or scraper and projects forwardly from the latter so as to be disposed under the forward portion of the frame of the machine. A vertically movable bar 26 passes through a suitable hole in rear portion of the tongue and is provided at its lower end with a jaw 27 which coöperates with a jaw 28 of a bracket 29 secured to the bottom face of the tongue, thus forming a clamp to engage the segmental yoke 25 and secure the mold board or scraper at any desired angular adjustment. The bar 26 of the clamp can be operated by means of a lever 30 pivotally mounted in a bracket 31 on the forward portion of the frame and having its shorter arm connected with the upper portion of said bar 26. A notched post 32 is secured to the frame bar 10 for coöperation with the lever 30 to lock the same and the clamp in position.

A standard 33 is secured to the frame bar 10 and supports a driver's seat 34 and adjacent to this seat foot rests or platforms 35 are secured to the framework.

From the construction and arrangement of parts above described it is apparent that by operating the hand wheels 18 to rotate the worms 17, the toothed segments 19 will be turned on their pivotal supports and the mold board or scraper elevated or lowered so as to adjust the same vertically. By swinging the carrier 14 the standards at the free ends thereof will move on the segmental plates 12 for effecting the angular adjustment of the mold board or scraper. When the mold board or scraper is being thus adjusted, the lever 30 will be released so as to permit the segmental yoke 25 to move freely between the clamping jaws 27 and 28. When the desired angular adjustment has been effected, the lever 30 will be depressed and locked to the notched post 32 so as to cause the clamping jaws 27 and 28 to tightly hold the yoke 25 and secure the mold board or scraper at the desired angular adjustment.

Having fully described my invention what I claim as new and desire to secure by Letters-Patent, is,—

1. In a machine of the character described, the combination with a roller and a frame supported thereby, of a pivoted carrier mounted on said frame, a mold board or scraper, adjusting devices connecting said mold board or scraper with the carrier, a yoke secured to the mold board or scraper, and means for locking said yoke to the frame.

2. In a machine of the character described, the combination with a roller provided with a circumferential enlargement, and a frame supported by said roller, of a mold board or scraper supported by the frame in advance of the roller, means for adjusting said mold board or scraper vertically and angularly, and means for locking the mold board or scraper at any desired angular adjustment.

3. In a machine of the character described, the combination with a roller, a frame supported thereby and attaching devices for draft animals at the forward end of said frame, of a ballast box at the rear of the frame, a mold board or scraper in advance of the roller, means for adjusting the mold board or scraper vertically and angularly, and means for locking the mold board or scraper at any desired angular adjustment.

4. In a machine of the character described, the combination with a frame and means for supporting the same, of a carrier pivotally supported between its ends upon said frame, standards at respective ends of said carrier, worms mounted in said standards, toothed segments mounted in the standards and meshing with said worms, a mold board or scraper, rods connecting the same with the toothed segments, and means for locking the mold board or scraper at any desired angular adjustment.

5. In a machine of the character described, the combination with a traveling frame, of segmental plates thereon, a carrier pivotally supported between its ends, standards at respective ends of said carrier and mounted to move on said segmental plate, worms mounted in said standards, toothed segments mounted in the standards and meshing with the worms, said toothed segments provided with outwardly projecting arms, a mold board or scraper disposed under the frame, rods pivotally attached at their lower ends to said mold board or scraper and at their upper ends to the outwardly projecting arms of the toothed segments, and means for operating said worms.

6. In a machine of the character described, the combination with a traveling frame, of a pivoted carrier mounted thereon, a mold board or scraper, connections between said mold board or scraper and pivoted carrier, a curved yoke secured to the mold board or scraper, a clamp for locking said yoke to the frame, and a lever for operating said clamp.

In testimony whereof, I have signed this specification in the presence of two subscribing witnesses.

HOWARD GRIMES.

Witnesses:
PATRICK J. TUMMINS,
J. P. COLPOYS.